United States Patent Office  3,252,154
Patented May 17, 1966

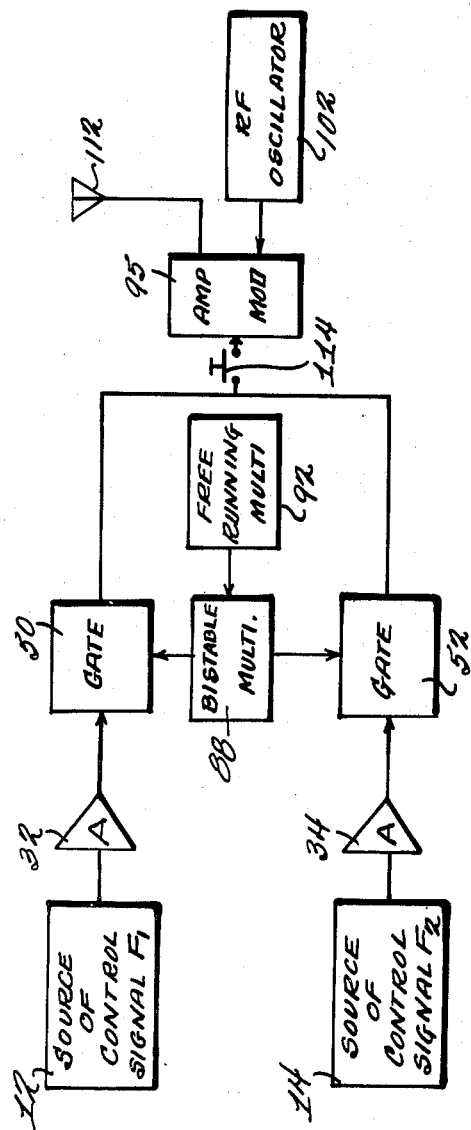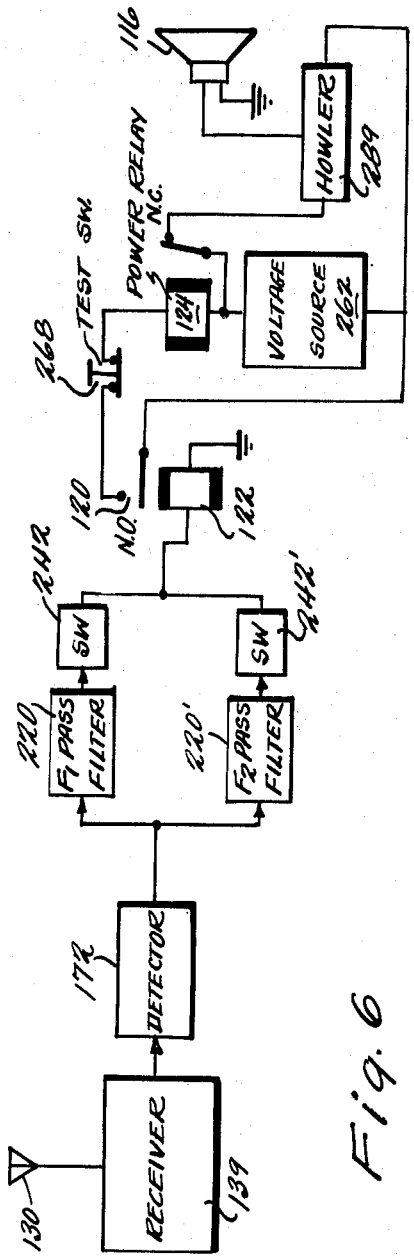
Fig. 6

3,252,154
FAIL-SAFE WARNING SYSTEM
Richard W. McKee, Winnetka, and Chester W. McKee, Flossmoor, Ill., and Brice E. Hayes, Richmond, Ind., assignors, by direct and mesne assignments, to Omnitronic Corporation, Richmond, Ind., a corporation of Indiana
Filed Jan. 15, 1963, Ser. No. 251,662
15 Claims. (Cl. 340—213)

This invention relates to a fail-safe warning system, and to sub-circuits thereof, especially to a discriminating control circuit by which operation of a warning device is controlled so that the device will effect a warning signal, for example an audible signal such as a siren, only if one or more of a plurality of normally alternately recurring control signals does not become abnormally absent for any one of a variety of possible reasons.

In general, this invention is an improvement over the system described and claimed in the copending application of Leo L. Galin, Serial No. 128,130, filed July 31, 1961, and entitled, "Fail-Safe Control System," and assigned to the same assignee as the present application.

The system described in this application has a variety of uses but like the Galin System is especially useful in warning a railroad work gang of an approaching train, and it is an object of the present invention to effect improvements over the Galin System.

Another object of the present invention is to provide a discriminating control circuit, and system in which same may be operative, in which there are improvements in the fail safeness whereby failure of any component in the system automatically effects a warning signal without fail.

Figure 1:
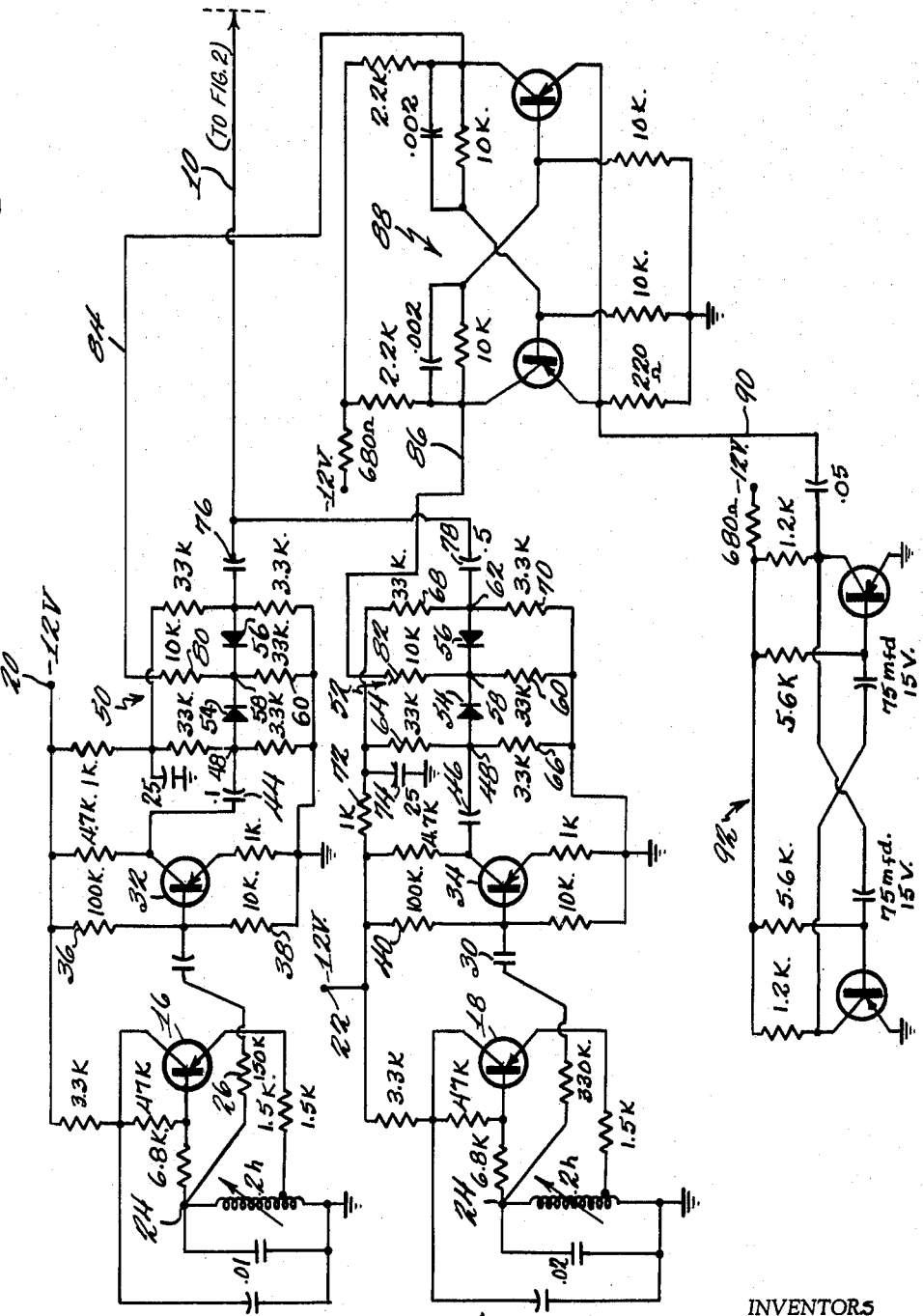
Figure 2:
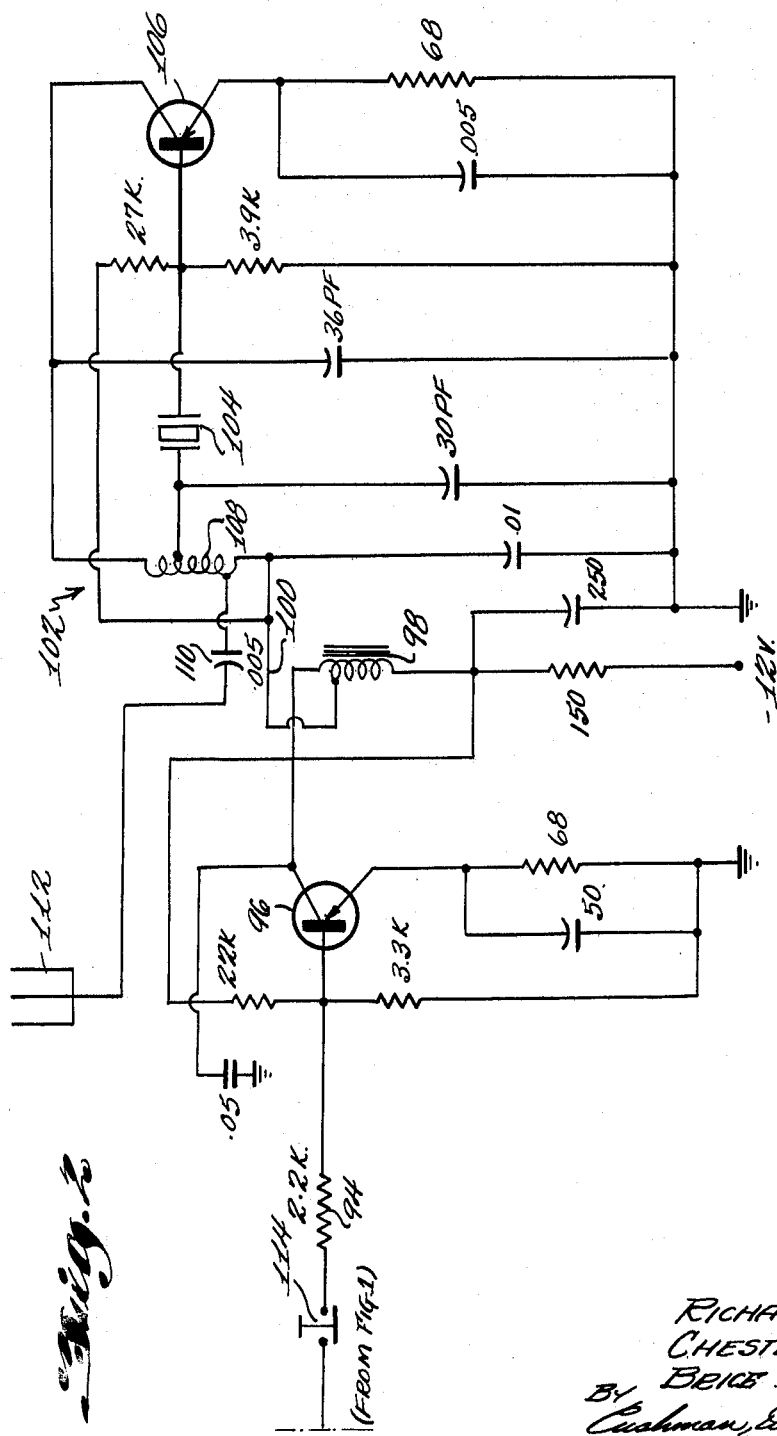
Figure 3:
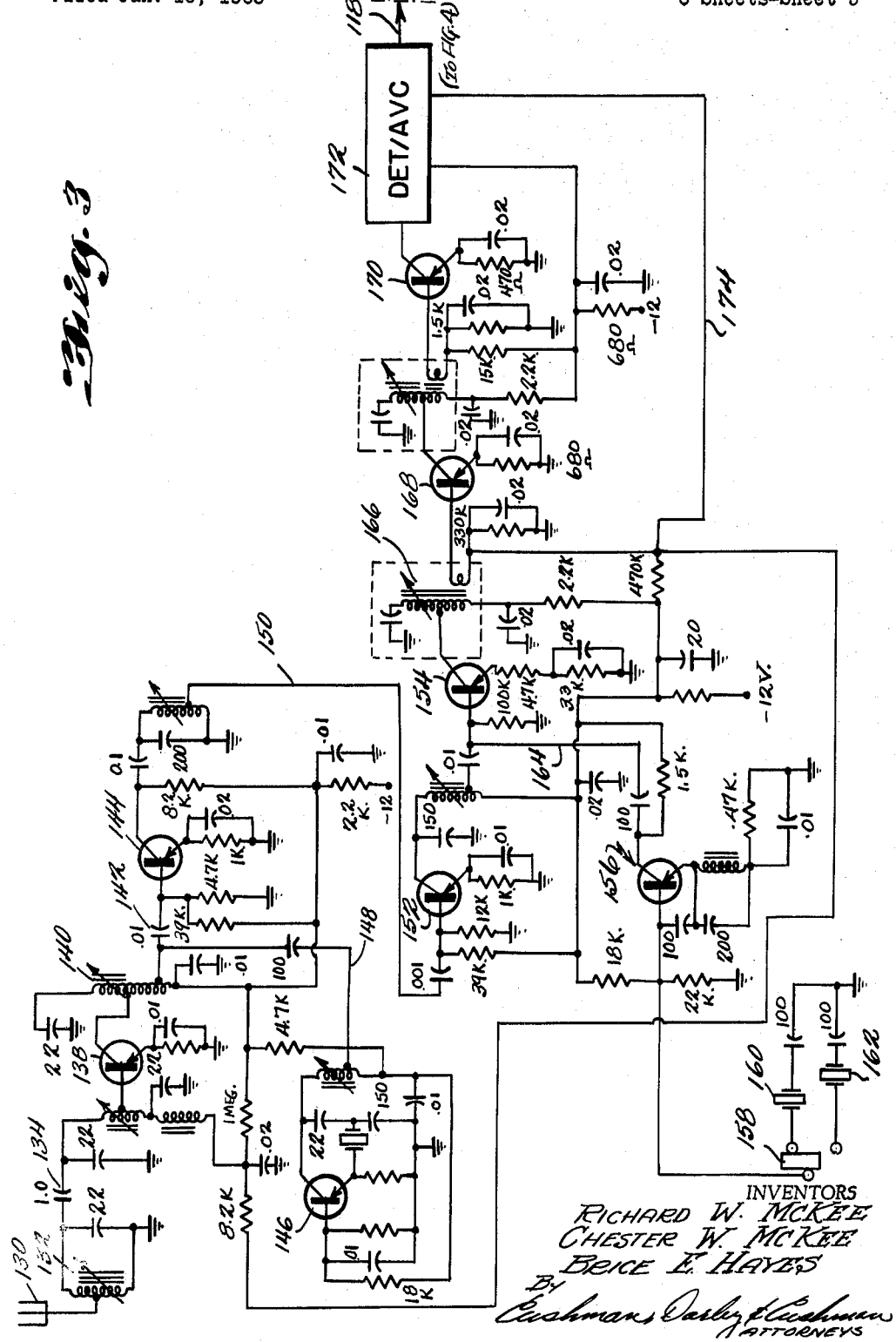
Figure 4:
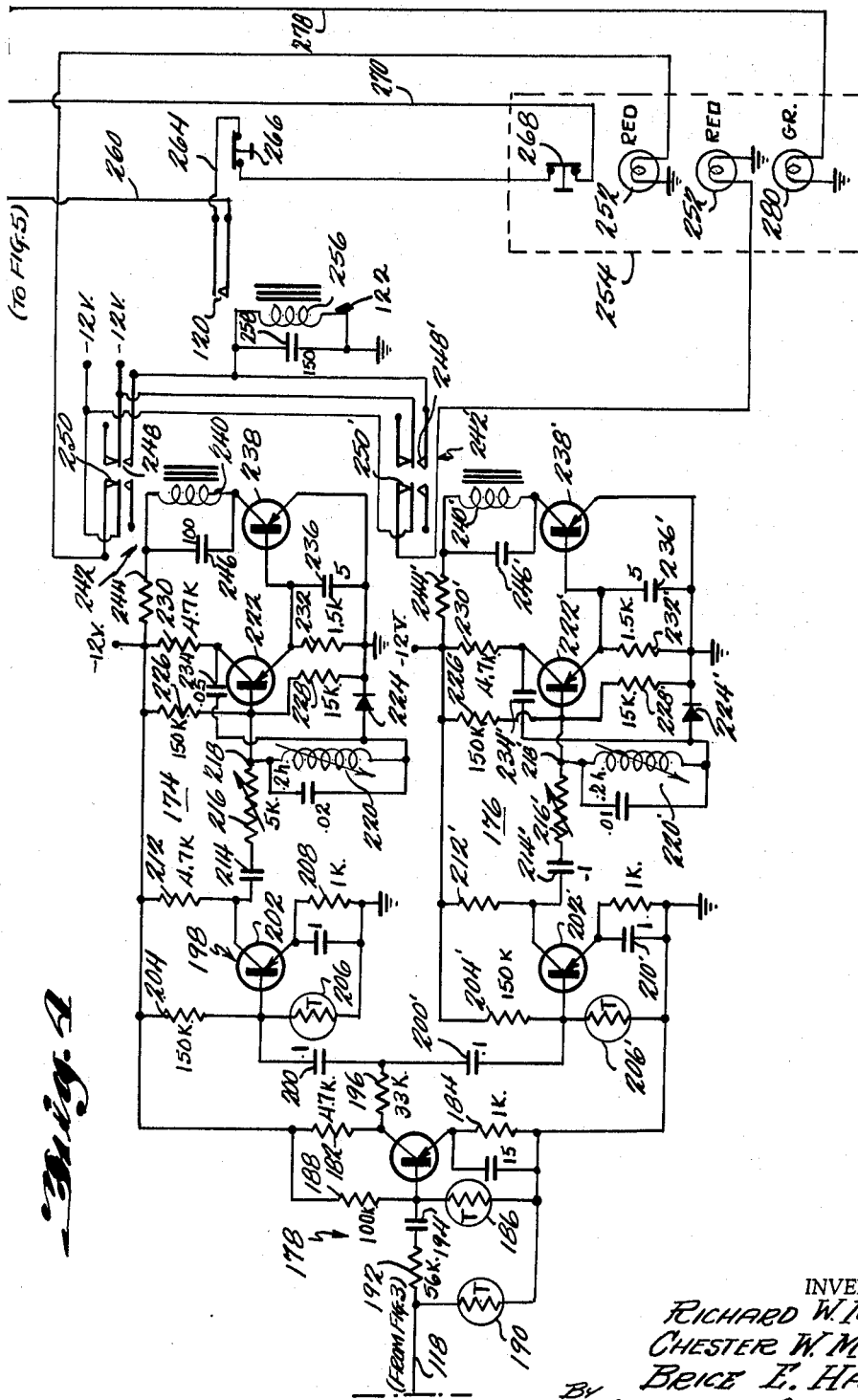
Figure 5:
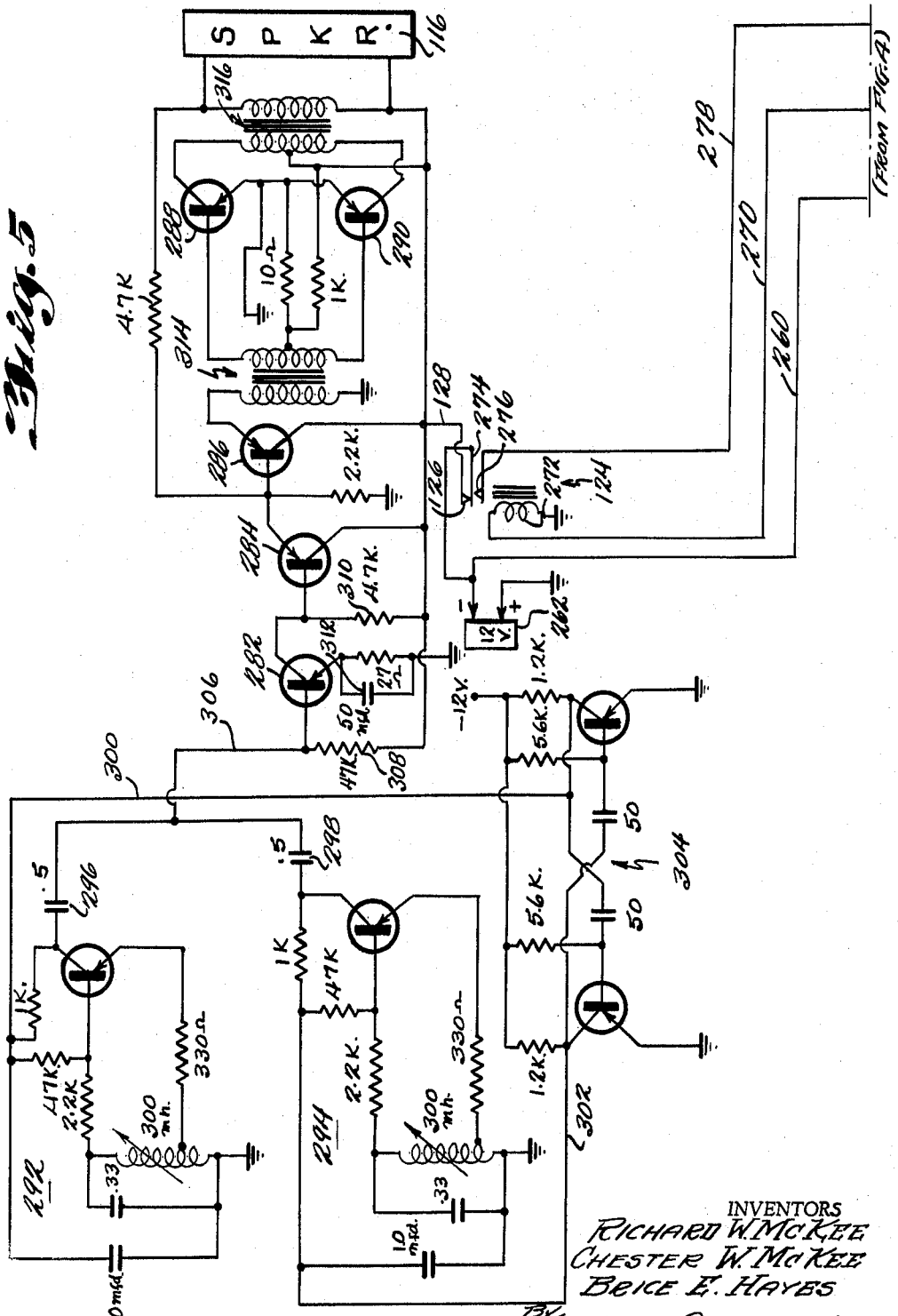

Other objects and advantages of this invention, as well as features thereof, will become more apparent by the appended claims and the following detailed description when considered in conjunction with the attached drawings, showing an exemplary embodiment of the invention, and in which:

FIGURE 1 is a schematic illustration of circuitry for developing timed control signals;

FIGURE 2 schematically illustrates a transmitter by which the developed control signals may be modulated onto a carrier wave and radiated;

FIGURE 3 schematically illustrates a dual conversion superheterodyne receiver;

FIGURE 4 schematically illustrates a frequency discriminating control circuit working out of the receiver of FIGURE 3; and FIGURE 5 schematically illustrates a controllable warning device circuit.

FIGURE 6 is a partial block diagram and a partial schematic of an illustrative embodiment of the entire system as illustrated in FIGURES 1 through 5.

In the drawings, parameters for different components are given and it should be understood that these are exemplary and are not intended to limit the invention, though they represent presently preferable operating values. Condenser valves are stated in microfarads, and resistances in ohms, unless otherwise noted (K means 1000 ohms).

In FIGURE 1 the control signals or "tones" as they will be referred to below for convenience, are developed and gated onto output line 10 by circuitry which includes two, different frequency, Hartley type oscillators 12 and 14. These oscillators are generally conventional utilizing single transistors 16 and 18 respectively, and preferably provide continuous sine wave outputs in the audio range, for example, 3,000 and 4,000 cycles respectively. Energy for continuous operation of each of these oscillators is derived through a respective source 20, 22 of voltage, and respective outputs are coupled from the internal junctions 24 through resistors 26, and respective output condensers 28 and 30. These two condensers connect the respective tones to the bases of transistors 32 and 34, which are normally biased appropriately by the potential dividing resistors 36, 38 and 40, 42 to cause the transistors 32 and 34 to conduct in a desired type of amplifier operation.

The collector outputs of these transistors are coupled respectively by condensers 44 and 46 to the inputs 48 of respective gates 50 and 52. As will be apparent, each of these gates includes two diodes 54, 56 connected cathode-to-cathode at junction 58 which is further connected to ground by resistor 60. Both diodes are normally biased to an off or nonconductive condition, by placing their respective anodes at a more negative potential than their cathodes. This biasing is accomplished by utilizing the voltage sources 20 and 22 respectively for the gates 50 and 52, across the potential dividers connected to the input junction 48 and output junction 62 of each gate. Resistors 64 and 66 form the input potential divider, while resistors 68 and 70 form the output potential divider. The source potential for these dividers is also connected to the collector of each of the transistors 32, 34, so a series resistor 72 feeds a grounded condenser 74 to effect filtering out of any of the A.C. components from the respective transistors. The output of gates 50 and 52 are taken via respective condensers 76 and 78, which are commonly connected to the tone output line 10.

As previously indicated, each of the gates 50 and 52 is normally in a nonconductive condition, i.e., will not pass the sinusoidal tone developed in the respective oscillator 12, 14, until the gate is "opened" to effect an output therefrom. In accordance with this invention, gates 50 and 52 are operated substantially mutually exclusively so that one and only one of the two different frequency tones appears on line 10 at a time. This alternation in the opening of gates 50 and 52 is accomplished by connecting their respective second input resistors 80 and 82 to the output lines 84 and 86 of a bistable multivibrator or flip-flop 88. This flip-flop is of the conventional, emitter-triggered or center-fed, toggling, transistorized type whereby successive pulses on the emitter input line 90 cause the flip-flop to change rather rapidly (say, within approximately 10 milliseconds) from the existing one of its bistable states, for example the one in which it is causing a gating pulse onto its output line 84, to the other of its stable states by which the gating pulse is switched to the other output line, for example line 86, and vice versa. Because of the transition time necessary to change its states, the successive flip-flop outputs may be time separated approximately 10 milliseconds, for example. Operation of flip-flop 88 may be effected by any desired circuitry that will cause appropriate pulses onto input line 90, and for this purpose there may be utilized an oscillator or balanced free-running (astable) multivibrator 92 which gives onto line 90 squarewave positive going pulses having a pulse repetitive frequency of approximately 80 pulses per minute (p.p.m.), for example. Each such pulse triggers flip-flop 88 into saturation in its opposite state, so circuit 88 may also be referred to as a binary frequency divider. As previously indicated, each change in state of flip-flop 88 changes the tone that occurs on output line 10, so with multivibrator 92 operating at an exemplary rate of 80 p.p.m. each frequency tone recurs about every 1.5 seconds and lasts for about 750 milliseconds.

These alternately recurring tones are coupled from line 10 in FIGURE 1 through resistor 94 in FIGURE 2 to the transmitter amplitude modulator 95 which includes transistor 96 and a tapped coil 98. The output of coil 98 is coupled by line 100 to the radio frequency oscillator circuit 102, which is controlled by crystal 104 to effect a desired carrier wave as generated by the oscillator the active element of which is transistor 106. The modulated carrier wave is extracted from the tapped oscillator inductance 108 by a condenser 110 and radiated via antenna 112.

The radiated signal, therefore, includes a relatively high frequency carrier wave, for example of a frequency in the order of 27.275 megacycles (mc.), which is continuously modulated by one or the other of the two tones generated and alternately gated by the circuitry of FIGURE 1. Normally, these tones are mutually exclusively present and mutually exclusively absent, in their modulation of the carrier wave, meaning that the carrier is substantially always modulated by one or the other, but not both, of the tones. In keeping with a feature of the system, that the transmitter and tone generator circuits are to be miniaturized sufficiently to be worn or carried by a man at a remote watchman's point along railroad tracks on which a gang of workmen is present, a manually operable switch is included in this circuitry to remove the tones from the wave radiated by antenna 112, if not to interrupt the carrier also. Switch 114, accordingly, is preferably in line 10 as shown, though it may be in the antenna circuit, or in any other portion of FIGURES 1 and 2, as desired. The switch may be of any desired type, and for operator convenience is preferably connected in line 10 at the opposite end of a two foot length of two conductor cable. With switch 114 so located as to cut off the tones when the switch is opened by an operator, interruption of the carrier wave modulation will thereupon occur. In other words, the normal recurrence of the modulating tones (and the continuous carrier, if desired) is broken and abnormal absence thereof occurs while switch 114 is open. It will be appreciated that since the tones normally recur alternately, the alternate absence of the tones during such times is a normal, rather than abnormal absence. It is only when one or more of the tones is absent when it should be present, that an abnormal absence occurs.

In keeping with the use of this invention for warning railroad workmen, there may be placed in the area of the workmen, remote from the operator of the transmitter circuitry, apparatus including the receiver of FIGURE 3, the discriminator of FIGURE 4 and the warning circuitry of FIGURE 5 with its output loud speaker 116 of which there may be more than one as desired. Generally speaking, the receiver of FIGURE 3 detects the modulated transmission from the transmitter of FIGURE 2 and demodulates same to provide on the receiver output line 118 an input to the FIGURE 4 discriminating circuit, which input is the normally alternately recurring tones of different frequencies as generated by the FIGURE 1 circuitry. As long as both of the different frequency tones recur normally, the normally open contacts 120 of the discriminator output relay 122 remain closed to establish a circuitry for energizing a power relay 124 (FIGURE 5). This causes the normally closed set of relay contacts 126 to be open, thereby removing operating voltage from line 128 and preventing any signal from reaching speaker 116. However, if either or both of the tones that should be present on the discriminator input line 118 of FIGURE 4, is or are abnormally absent, relay 122 opens its contacts 120 and effects de-energization of power relay 124, which in turn closes its contacts 126 and energizes the circuitry to which line 128 is connected. As is later explained in detail, energization of line 128 effects operation of the output circuitry in FIGURE 5 and causes audible signals to be sounded by speaker 116.

In greater detail, the circuitry of FIGURES 3, 4 and 5 operate as now described. In FIGURE 3, the modulated carrier wave is received by antenna 130 and delivered to the tunable tank circuit 132 from which it is coupled by condenser 134 to another tunable tank circuit 136. The circuitry associated with transistor 138 effects amplification of the modulated carrier wave as extracted via the tapped coil of tank circuit 136, and the amplified signal is delivered via a tunable inductance 140 and a coupling condenser 142 to a mixing circuit including transistor 144.

Utilizing the example above given as to the frequency of carrier wave transmitted, the output of amplifier 138 is accordingly 27.275 mc. The type of receiver 139 depicted in FIGURES 3 and 6 is a dual conversion superheterodyne. The first local oscillator 146, which is of the crystal controlled type, produces an output signal on line 148 of approximately 21 mc. This signal as coupled to the mixer 144 causes a high intermediate frequency signal of 6.275 mc. on mixer output line 150. The high IF signal is then amplified via the circuitry including transistor 152 and mixed by the circuitry involving transistor 154 with another local oscillation from the oscillator circuit 156. This oscillator circuit is also crystal controlled, and includes a switch 158 for alternately using a 5820 kc. crystal 160 and a 6920 kc. crystal 162. Either one of these frequencies, when beat or heterodyned against the higher IF frequency of 6275 kc., gives a desired lower intermediate frequency of 455 kc. In other words, the output of oscillator 156, as present on line 164 is mixed with the higher IF signal from amplifier 152, to cause a 455 kc. signal in the tunable tank circuit 166. This signal is then amplified by amplifiers 168 and 170, following which the modulation is detected by circuit 172 and supplied to line 118 stripped of the carrier wave. Circuit 172 may act not only as a detector, but in conventional manner to supply an automatic volume control signal back to the circuits connected to feed back line 174.

The detected modulation, i.e., different frequency alternately recurring tones detected by the FIGURE 3 circuitry, is present on line 118 as an input to the discriminator control circuitry of FIGURE 4. This circuitry preferably includes a plurality of channels, for example, upper and lower channels 174 and 176, it being appreciated that the number of channels and the number of different frequency tones are the same, two in the case being specifically described. Common to each of these channels is a pre-amplifier circuit 178. This includes transistor 180, the collector of which is coupled to a negative voltage source via resistor 182, and the emitter of which is coupled to ground by transistor 184. Stabilized operation of the transistor is aided by use of a thermistor 186, serially connected to resistor 188 at the base of transistor 180. In addition, another thermistor 190 is utilized, between line 118 and ground, ahead of the input resistor 192 and coupling condenser 194. With these two thermistors, considerable variation in external and internal temperature may be experienced without changing operating characteristics of the pre-amplifier 178 to a significant degree. The collector output from transistor 180 of the pre-amplifier circuit is serially coupled by resistor 196 to respective driver amplifiers of the channels 174 and 176. Since each channel is exactly the same as the other, except for its tank or discriminator circuit and resultant assigned frequency, only the upper channel 174 will be described in detail, it being appreciated by the use of the same numbers primed that the lower channel is similar.

The signal from the common input resistor 196 is coupled to driver amplifier 198 via condenser 200. The base of the amplifying transistor 202 is held at a given D.C. operating condition by a potential divider which includes resistor 204 and thermistor 206, notwithstanding heat variations. Bias on the emitter is effected by resistor 208 to ground, with the A.C. signal components being filtered out by condenser 210. The collector of transistor 202 obtains its operating voltage through resistor to 212, and the collector output of the resistor is coupled by condenser 214 and variable resistor 216 to junction 218. At this junction is connected a parallel LC circuit 220 appropriately tuned to discriminate against all of the different frequency tones that may be incoming on line 118, except a given one thereof which this discriminator by effectively being a high impedance thereto, causes to be passed to the base of transistor 222. In other words, the discriminator circuit 220 assigns to channel 174 a particular frequency (as broad or narrow in range as desired) by rejecting, i.e., passing to ground via diode 224 the frequencies to which the channel is not to be responsive. As between the two different frequency tones coming in on line 118, the upper channel discriminator 220 will ground out, say, the higher frequency tone and allow the lower frequency tone to be applied to transistor 222. On the other hand, the lower channel discriminator 220′ will cause the lower frequency control tone to be grounded via diode 224′, and pass to transistor 222′ the higher frequency one of the two incoming tones. Transistors 222 and 222′ operate on the different frequency tones mutually exclusively by virtue of the respective channels being assigned a different one of the control tones by the differently tuned LC circuits 220 and 220′. Tuning of these tank circuits may be accomplished by varying the inductor slugs for example, while variation of the respective input resistors 216 and 216′ may aid in balancing the circuits.

Transistor 222 is connected in an emitter follower configuration, with its base being established at a predetermined D.C. operating point by the potential divider including resistors 226 and 228. The collector and emitter of transistor 222 are respectively coupled to resistors 230 and 232 between the negative source of voltage and ground. Additionally, the collector output is fed back by condenser 234 as a partially re-generative signal to the junction between the filter or discriminator 220 and diode 224, to give added gain and selectivity to the control circuit. Variations in the emitter output are smoothed to a sufficient extent by filtering condenser 236 and applied to the base of transistor 238.

The emitter of transistor 238 is connected directly to ground and the collector thereof serially to the coil 240 of relay 242 and resistor 244 to the operating voltage source. Condenser 246 parallels relay coil 240 for two purposes. First, it serves as a time delay for the relieving of the relay. Normally, because of the mechanical characteristics of the relays 242 and 242′, they will drop out faster than they will pick up. If it were not for condensers 246 and 246′, relay 122 would be undesirably pulsed during the transition time if one of the relays 242, 242′ releases before the other picks up. Secondly, these condensers serve to limit the reverse transient voltages which if allowed to occur unlimited might damage transistors 238 and 238′.

Relay 242 has one normally open set of switch contacts 248 and one normally closed set of contacts 250. The movable arms of each of these switch contact sets are connected to a negative source of potential, and with the respective switch contact operate to complete different circuits. That is, switch contacts 250 operate an indicator lamp 252, for example, a red light, disposed in a remotely located monitoring unit 254. As will become apparent, this red light flashes alternately on and off continuously as long as the control tone associated with the respective channel continues to recur normally, and this it does in alternation with the flashes of red light 252′ which is associated with the other control tone assigned to the lower channel 176. That is, these two red lights alternately flash on as long as the control tones recur normally as they are supposed to, but as will become apparent if one or the other of those tones becomes abnormally absent, the corresponding red light will remain on steadily.

The other set 248 of relay switch contacts is parallel connected with the corresponding set 248′ of relay contacts for the lower channel, and to the coil 256 of relay 122. As will be recalled, this latter relay has a set of normally open contacts 120, which are consequently closed as long as the control tones continue normally to recur alternately due to alternate closures of the relay switch contacts 248 and 248′. As previously indicated, there is substantially no time during which one or the other of the two tones, in a normal recurrence situation, is not occurring, so in effect relay coil 256 is being substantially continuously fed from the source of voltage through one or the other of relay switches 248, 248′. Coupled across relay coil 256 however, is a condenser 258, which has some holding capacity that tends to temporarily store the closed position of relay contacts 120, i.e., act as a time delay to prevent chatter thereof and consequent undue pulsing of the warning horn in case there is some relatively insignificant period of time between opening and subsequent closure of one and then the other of relay switches 248 and 248′, as might occur for example when the transmitter is located near its fringe area whereby received signals may be subject to instantaneous fading.

In any event, the operation of relay 122 is such that its contacts 120 are pulled together upon energization of coil 256, and remain closed while all circuitry preceding that relay, including that of FIGURES 1, 2 and 3 as well as FIGURE 4, continues to operate in the normal and intended manner. However, if any significant component of any of that circuitry fails, or if either one or both of the control tones is or are caused to cease for an abnormal length of time, as may be effected by interrupting the transmission from antenna 112 in FIGURE 2 by opening switch 114, condenser 258 across relay coil 256 in FIGURE 4 is insufficient to maintain switch contacts 120 closed. That is, taking as an example, the abnormal absence of a single pulse or tone burst of a given frequency, such absence will cause the previously closed switch contacts of, say, relay 242, i.e., switch contacts 248, to open for a period of time corresponding substantially to the period of the missing tone pulse in addition to the normal open time of these switch contacts that occurs on both sides of the missing pulse time. For example, assuming both control tones of the same duration, as would naturally be the case utilizing the circuitry of FIGURE 1, if a single one of the recurring bursts of frequency corresponding to the upper channel 174 becomes missing for any given reason, then relay switch contacts 248 are released to their normally open positions beginning just after the ending of the last similar burst of the same frequency and continuing through three time periods each of which is of approximately the same duration as either one of the tone bursts. This, it will be appreciated, triples the length of time that switch contacts 248 are open, and prevents relay coil 256 from receiving a pulse of energy during the time the single missing tone is abnormally absent, and under such conditions the storage capacity of condenser 258 is insufficient to hold relay 122 energized, so its contacts 120 open. Contacts 120 immediately re-close upon recurrence of a burst of either frequency, and operation continues as before the missing burst or bursts of either or both frequencies.

With the above explanation, it will be apparent that power relay 124 in FIGURE 5 remains energized as long as the relay switch contacts 120 of relay 122 in FIGURE 4 are held closed, since line 260 from one side of switch contacts 120 connects to the negative side of source 262, while the other side of switch contacts 120 is coupled by line 264, normally closed push button switches 266, 268, and line 270 through relay coil 272 to ground. With power relay 124 being energized thereby, its armature 274 is pulled downward so as to keep the switch contacts 126 open and hold switch contacts 276 closed. These latter switch contacts close a circuit that extends via line 278 into the monitor unit 254 of FIGURE 4, to cause an indicator lamp 280, for example a green light, to be on. In other words, green light 280 is on as long as power relay 124 of FIGURE 5 is energized, which under normal circumstances is a continuous situation. In that case, not only is the green light steadily on, but red lights 252 and 252' flash on alternately, as previously indicated. If a given one of the tones becomes abnormally absent, the corresponding red light will come on steadily and the green light 280 will flash on and off since power relay 124 is then continuously energized and deenergized. If both of the control tones become abnormally absent, then both red lights remain on steadily, and the green light is off during the continuance of such a condition.

While power relay 124 in FIGURE 5 is energized so that its armature 274 is pulled downwardly, switch contacts 126 are open and no potential is applied to line 128, all as previously indicated. This keeps an operating potential off the collector of each of the transistors 282, 284, 286, 288, and 290, thereby preventing any output to speaker 116 during such times. However, when power relay 124 is deenergized because of the abnormal absence of one or more bursts of either or both of the different frequency control tones, or the break-down for example of relay coil 256 in FIGURE 4, the fail-safe features of the overall circuitry come into play to cause an audible warning signal to be emitted from speaker 116. Of course, instead of an audio warning signal, a visual warning signal may be utilized if desired, either alone or in combination with an audible warning signal.

Generation of a signal sufficient to energize speaker 116 to effect an audible warning while relay switch contacts 126 are closed, is effected by the FIGURE 5 circuitry in the manner now to be described. Two Hartley type oscillators 292, 294, each of which may be similar to the oscillators 12 and 14 in FIGURE 1, are tuned (by varying inductance slugs, for example) to provide through their respective output coupling condensers 296 and 298, two different audio frequency signals, for example of 260 and 280 cycles, respectively. The output of the oscillators 292 and 294 are of the square wave type, preferably with low fundamental frequencies as indicated, so that there is a rich or high harmonic content in the output of each oscillator which when amplified will give many strong harmonics from the very low audio frequency range on up to inaudibility. The two separate frequencies of oscillators 292 and 294 are not harmonics of each other, i.e., neither is a multiple of the other, and in this manner there is less chance of not having an audio output from speaker 116 which cannot be heard by every intendee quite distinctly.

To cause the siren-like effects from speaker 116, oscillators 292 and 294 are turned on and off alternately by connecting them respectively by lines 300 and 302 to opposite outputs of a free-running or astable multivibrator 304 the timing constants of which suggest an operation of about 130 p.p.m. and regulate the change over rate from one oscillator to the other. Multivibrator 304 alternately switches collector voltage to the two oscillators, the outputs of which as taken via respective condensers 296 and 298 are applied by line 306 to the base of amplifying transistor 282. With relay switch contacts 126 closed, the negative potential on line 128 is delivered to amplifying transistor 282 via base resistor 308 and collector resistor 310, the emitter of this transistor being coupled to ground by the parallel RC circuit 312. The amplified signal from the collector of transistor 282 is applied through two emitter follower transistors 284 and 286 to the primary winding of a transformer 314 whose secondary winding forms the input to a balanced or pushpull amplifier the output of which is coupled by transformer 316 to speaker 116. Preferably, two speakers are connected in parallel to the secondary of transformer 316, which in conjunction with the preceding circuitry provides the two alternately occurring square wave oscillations to the speakers at about 20 watts audio power. Though oscillators 292, 294 as between themselves continuously supply a signal because multivibrator 304 operates continuously, their outputs are effectively gated through the several transistors to the speaker by the presence of a collector enabling signal on line 128 while switch contacts 126 remain closed. Thus oscillators 292 and 294, free running multivibrator 304, amplifiers 282 and 286, and emitter follower 284 may be collectively referred to as a howler 289 as indicated in FIGURE 6.

Thus, it should be apparent that this invention provides apparatus which is fully fail-safe from power relay 124 on back through FIGURE 1, including failure of the operator in any manner, since transmission interruption switch 114 in FIGURE 2 is of the normally open "dead man" type that must be continuously closed by the operator to prevent an audio signal from speaker 116. Physical location of the different units of the overall system may be as desired for the situation at hand, and it will be appreciated that due to the ability of the receiver to pick up a transmitted signal from antenna 112 from a considerable distance, the receiver may be located in the immediate area where the audible warning signal needs to be heard, while the transmitter and tone generator circuits of FIGURES 1 and 2 may be removed sufficiently to the best vantage point for the type of application to which the warning system is being applied. For example, when the warning system is utilized with railroad workmen, an operator of the transmitting unit would be located down the track a half mile, more or less, from the working gang, as desired. In addition, another transmitter operator may be located up the track a similar distance, especially in dual-track situations, so as to be able to warn of trains approaching from either direction in sufficient time for the workmen to clear themselves from the tracks.

Two test switches 266 and 268 are shown in FIGURE 4, and these may be utilized for the purpose of determining that the FIGURE 5 circuitry as well as relay contacts 120, are all in proper working order. Push button switch 266 may be located on the housing for the receiver circuitry of FIGURE 3, or on the housing for the circuits of FIGURES 4 or 5, as desired; while push button switch 268 is preferably located remotely with the monitor unit 254. "Remotely" in this sense does not refer to a location up or down the track to the extent of the transmitting unit by far, but whatever distance away from the receiver and audio sections desired where a safety-control man may be safely situated as desired, to watch the operation of the red and green lights and check circuitry operation by push button 268.

Though the system has been above described relative to manual operation of the transmitter switch 114, such can be automatically operated in any desirable manner, for example by detection of the approach of a train by a sensing device of any desired sort located near the track an appropriate distance away from the work gang. Magnetic field disturbance, heat sensitivity, or photoelectric interruptions are a few of the numerous ways in which a detecting device may operate to sense an approaching train. Further, whatever the type of detecting mechanism, it may be mounted, along with the transmitter and tone generating unit, on a remotely controlled buggy riding on the same track as the work gang but kept at a proper distance from the gang as the gang progresses along the track. Such a buggy is featured in the Brice E. Hayes Patent No. 3,000,099, and use thereof would of course eliminate the necessity of a man as watchman downtrack. If desired, two such buggies, one each way from the gang, may be employed, so that traffic from both directions may be detected. In such a case, and this applies equally as well when no such buggies but instead two watchmen stations are so deployed, respective transmitters operating on different sets of frequencies into respective differently tuned receivers at the work gang location, or synchronized transmitters operating on the same frequencies into the same receiver, may be employed.

One of ordinary skill in the art will appreciate, after reading this disclosure, that numerous variations may be made in the circuitry of the exemplary embodiment described in detail above, but it should be realized that this disclosure including the accompanying drawings is not to be considered limitative but only illustrative, the scope of the invention being defined in the appended claims.

What is claimed is:

1. A fail-safe discriminating control circuit for continuously energizing a device only as long as different frequency, effectively non-spaced, control signals, which are subject to abnormal absence, continue normally to recur alternately, comprising:
 (a) a plurality of parallel channels having a common input for receiving all said control signals,
 (b) a plurality of discrimination-rectification means respectively in said channels for effectively assigning said control signals respectively to said channels by discriminating against all said control signals except a respective one which is thereby passed as a rectified recurrent output,
 (c) a plurality of normally open switch means respectively coupled to said discrimination-rectification means and alternately reclosed by and for the effective duration of the said outputs of said discrimination-rectification means respectively, each said switch means reopening between recurrences of the said respective recurrent output and
 (d) means coupling the outputs of said switch means together for continuously energizing said device as long as all said switch means continuously reclose alternately because of the said normal recurrence of said control signals but for intermittently energizing said device if any one of said switch means does not reclose because of the abnormal absence of the respective control signal and for preventing energization of said device if none of said switch means recloses because of the abnormal absence of all said control signals.

2. A circuit as in claim 1 wherein each of said switch means includes a relay having a coil, at least one set of normally open switch contacts, and a condenser across said coil, said energizing means including connection of said switch contacts in parallel between a source of voltage and said device.

3. A fail-safe discriminating control circuit for continuously energizing a device only as long as different frequency, effectively non-spaced, control signals, which are subject to abnormal absence, continue normally to recur alternately, comprising:
 (a) a plurality of parallel channels having a common input for receiving all said control signals,
 (b) a plurality of discrimination-rectification means respectively in said channels for effectively assigning said control signals respectively to said channels by discriminating against all said control signals except a respective one which is thereby passed as a rectified recurrent output,
 (c) a plurality of normally open switch means respectively coupled to said discrimination-rectification means and alternately reclosed by and for the effective duration of the said outputs of said discrimination-rectification means respectively, each said switch means reopening between recurrences of the said respective recurrent output and
 (d) means coupling the outputs of said switch means together for continuously energizing said device as long as all said switch means continuously reclose alternately because of the said normal recurrence of said control signals but for intermittently energizing said device if any one of said switch means does not reclose because of the abnormal absence of the respective control signal and for preventing energization of said device if none of said switch means recloses because of the abnormal absence of all said control signals, wherein said energizing means includes a further normally open switch means held closed as long as any one of the first mentioned switch means is effectively closed as aforesaid.

4. A circuit as in claim 3 wherein said further switch means includes a relay having a coil, a set of normally open switch contacts, and a condenser across said coil.

5. In a fail-safe warning system, the improvement comprising:
 (a) warning circuit means for developing a warning signal and including first switch means, normally closed, for causing occurrence of said warning signal while closed and preventing occurrence thereof when held open,
 (b) a pair of parallel channels having a common input for receiving two discrete control signals of different frequency which are subject to abnormal absence but normally continue to recur alternately in a substantially mutually exclusive on and off form,
 (c) a pair of discrimination-rectification means respectively in said channels for effectively assigning said control signals respectively to said channels by discriminating against one of said control signals and passing the other thereof as a rectified recurrent output,
 (d) second and third switch means, normally open, respectively coupled to said rectification means and alternately reclosed by and for the duration of the respective recurrent outputs of said rectification means, and
 (e) means coupled to the said first switch means and from both of the outputs of said second and third switch means for holding said first switch means open as long as the second and third switch means continue to reclose alternately in response to normal alternation of said pair of control signals, but for releasing said first switch means to its normally closed position to effect said warning signal if either one of said control signals is abnormally absent so as to cause the respective one of the second and third switch means to remain open for a period of time sufficient to cause the said (e) means to effect closure of said first switch means.

6. The improvement in claim 5 wherein the said (e) means includes fourth switch means normally open but closed substantially only while either of said second and third switch means is closed for causing said first switch means to be open.

7. The improvement in claim 6 wherein each of the said four switch means is a respective relay having a coil and at least one switch contact, there being a respective condenser across at least the coil of the said fourth switch means, the said switch contacts of said second and third switch means being connected in parallel between said condenser and a voltage source.

8. The improvement in claim 7 wherein each of the said first, second, and third relays has a respective second switch contact connected to a respective indicator lamp, the second switch contact for the first relay being normally open whereby the respective lamp therefor stays lighted except while either or both of said control signals is abnormally absent, the said second switch contact for each of the said second and third relays being normally closed whereby their respective lamps flash off alternately while said control signals normally recur alternately but each stays on as long as its respective control signal is absent.

9. The improvement of claim 5 wherein said warning circuit means includes two oscillators and a multivibrator for operating said oscillators alternately into an effective gate including the said first switch means, there being a speaker coupled to the output of said gate for effecting an audible warning in response to operation of said oscillators if said first switch means is caused to be in its said normally closed position.

10. The improvement in claim 5 and further including apparatus for generating and transmitting an output signal normally containing said control signals as aforesaid, said apparatus including a pair of oscillators for supplying the said different frequency control signals continuously, a pair of normally closed gates respectively coupled to the outputs of said oscillators, and means including a multivibrator for opening said gates alternately to supply said control signals in alternation.

11. A system as in claim 10 including a transmitter having a continuous carrier wave generator and means for modulating said carrier wave by the alternately gated different frequency control signals.

12. A system as in claim 11 wherein said transmitter effects a radiation of said modulated carrier wave, said system further including a receiver for demodulating the received said radiated carrier wave and modulation for presenting the modulation only to said common input of the aforesaid pair of channels.

13. A system as in claim 12 wherein said receiver is of the dual conversion superheterodyne type.

14. A system as in claim 10 wherein said oscillators and multivibrator are of the free-running type, and a flip-flop is included between the output of the free-running multivibrator and a respective input of said gates whereby the multivibrator output continuously alternates the flip-flop between its stable states thereby both opening and closing said gates mutually exclusively.

15. A system as in claim 10 wherein said gates are each of the diode-resistance type and include means coupled to an input diode for biasing that diode to a non-conductive state in the absence of an appropriate output from said multivibrator.

References Cited by the Examiner

UNITED STATES PATENTS

| | | | |
|---|---|---|---|
| 2,353,499 | 7/1944 | Purington | 340—171 X |
| 2,461,456 | 2/1949 | Usselman | 178—66 |
| 2,806,944 | 9/1957 | Sheffield et al. | |
| 3,009,134 | 11/1961 | Brosh | 340—171 |
| 3,031,527 | 4/1962 | Barton et al. | 178—66 |
| 3,104,373 | 9/1963 | Salihi | 340—171 X |

OTHER REFERENCES

Brown et al., "Transistors, A New Class of Relays," in Control Engineering, Dec. 1956, pp. 70–76.

NEIL C. READ, *Primary Examiner.*

ROBERT M. ANGUS, *Assistant Examiner.*